Aug. 21, 1956        J. KRAWCZAK        2,759,435

DOUGH MOLDING MACHINE

Filed June 11, 1953        2 Sheets-Sheet 1

INVENTOR.
JOSEPH KRAWCZAK.
BY
Louis V. Lucia
ATTORNEY.

Aug. 21, 1956 J. KRAWCZAK 2,759,435
DOUGH MOLDING MACHINE
Filed June 11, 1953 2 Sheets-Sheet 2
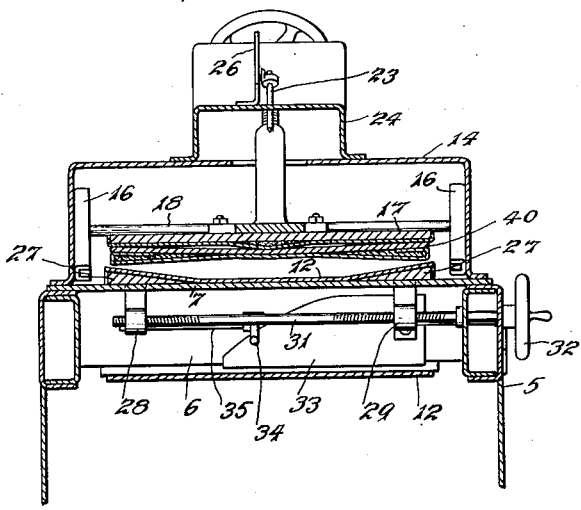
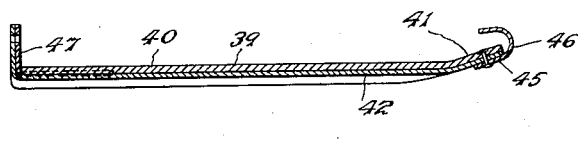
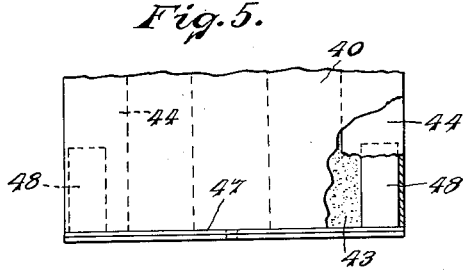
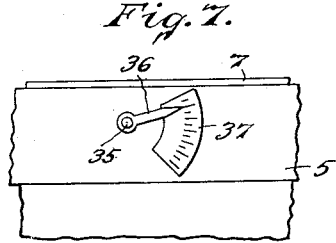
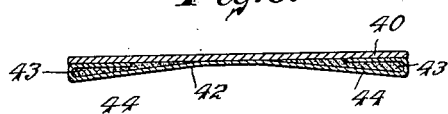
INVENTOR.
JOSEPH KRAWCZAK.
BY
Louis V. Lucia
ATTORNEY.

United States Patent Office 2,759,435
Patented Aug. 21, 1956

2,759,435

DOUGH MOLDING MACHINE

Joseph Krawczak, Hartford, Conn.

Application June 11, 1953, Serial No. 360,955

9 Claims. (Cl. 107—9)

This invention relates to a dough molding machine and more particularly to attachments for such machines which are intended for increasing the usability of the machines in the forming of dough for loaves of bread and the like of different shapes.

It is an object of this invention to provide, for a dough molding machine, a pressure board which may be adapted for molding dough for bread loaves of different shapes.

A further object of the invention is the provision of adjustable means for varying the shape of the loaf produced within the limits of the capacity of the machine.

A still further object of this invention is the provision of improved indicating means for facilitating the adjustment of the machine for the desired sizes and shapes of bread loaves.

Further objects and advantages of this invention will be more clearly understood from the following description and from the accompanying drawings in which:

Fig. 3 is a sectional end view on line 3—3 of Fig. 2.

Fig. 4 is a side view of the adapter for the pressure board included in the present invention.

Fig. 5 is a plan view of an end portion of said adapter.

Fig. 6 is a sectional end view of said pressure board.

Fig. 7 is a side view of a portion of the machine showing an indicator included in the present invention.

Figure 1:
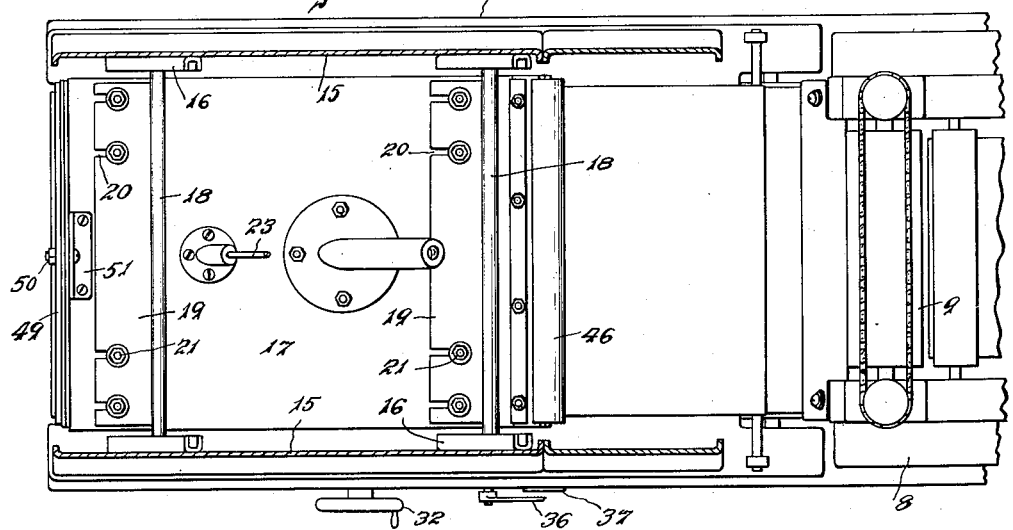
Fig. 1 is a plan view of a machine embodying my invention.
Figure 2:
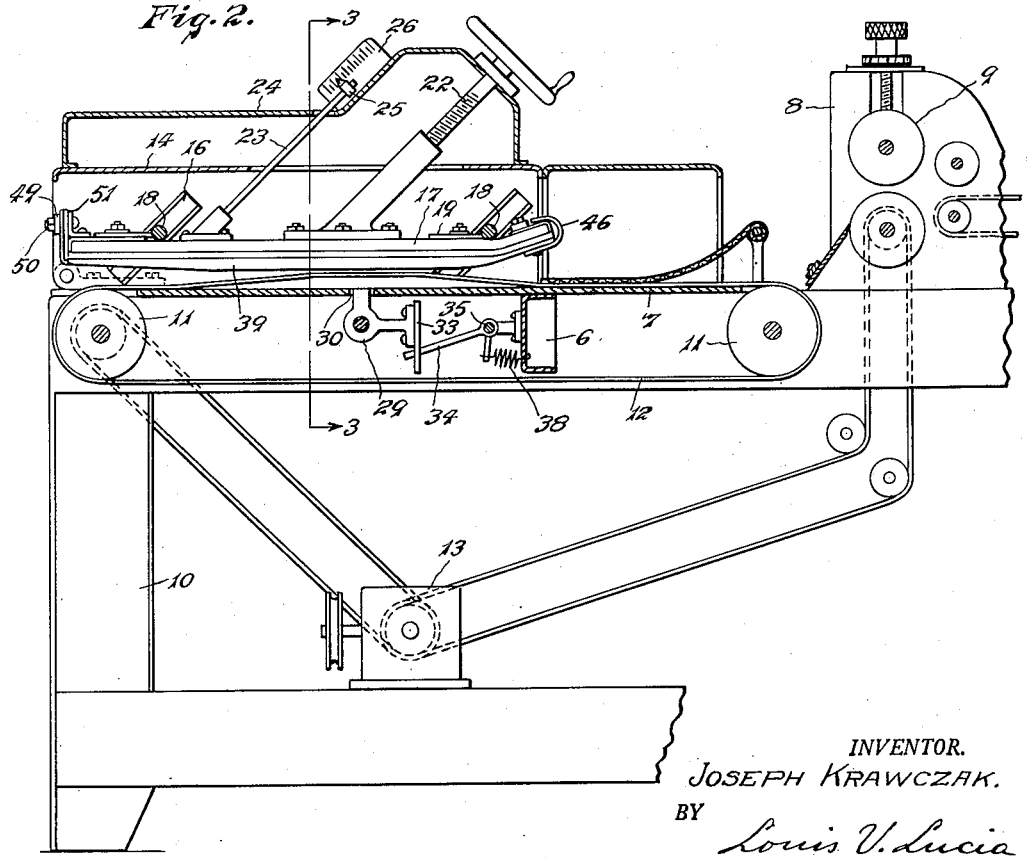
Fig. 2 is a side view showing said machine partly in central section.

In the embodiment illustrated in said drawings, my improved molding machine includes a frame having spaced side bars 5—5 which are connected by suitable cross bars 6 supporting a table 7 and a roll unit which includes side supports 8—8 and a suitable series of rolls 9 for delivering sheeted dough to the machine. The said frame is supported on suitable legs 10 and has rotatably mounted thereon a pair of rolls 11—11 over which there is carried and endless belt 12 having one side thereof running over the table 7. The said side of the belt is movable in a direction away from the roll unit and towards the end of the machine and the belt is driven by means of a suitable source of power which may be transmitted through a speed-reduction unit indicated at 13.

Upon the top of the machine frame there is mounted a hood 14 which extends over the table 7 and has side walls 15—15 that rest upon the side members 5—5. Suitable angular supporting members 16 are mounted in spaced relation upon the opposite side walls of the hood upon said walls.

A pressure board in the form of a carrier 17 is supported over the table 7 and the belt 12 by means of cross bars 18—18 which are connected to cross plates 19—19 which are secured to said bars and have slots 20 therein that receive screws 21 for adjustably securing the cross bars to the carrier. The said cross bars extend into inclined grooves in the member 16 and thereby adjustably support the carrier at different distances above the table and the belt. A suitable screw 22 is provided, for raising or lowering the said carrier, and is also inclined at an angle to conform with the angle of the grooves in the member 16.

In order to indicate, at the exterior of the machine, the exact distance between the top of the belt and the carrier, there is provided a rod 23 which is mounted upon the carrier and projects, at the same angle as the grooves in the members 16, through an opening in an auxiliary hood 24 that is mounted upon the hood 14. The projecting end of the said rod 23 has a pointer 25 thereon which registers with suitable graduations on a scale 26 that is mounted upon said auxiliary hood.

As the belt 12 passes over the table 7, it moves over elongated wedge members 27—27 which are slidable crosswise upon the table 7 so as to bend the sides of the belt upwardly to vary the shape of the dough as it is passed between the said belt and the carrier 17. The said wedge-shaped members 27—27 have secured thereto hangers 28 and 29 which depend from said members through a cross slot 30 in the table 7 and are threaded to a feed bar 31 by means of oppositely handed threads which move said hangers in opposite directions upon the rotation of the said screw by means of a hand wheel 32 which is located at the side of the machine.

In order to indicate the relative location of the members 27—27, there is provided a cam plate 33 which is carried by the hanger 29 and operates a bar 34 for rotating an indicator shaft 35 that is rotatably mounted upon the cross bar 6 and extends through the side of the machine to a position near the hand wheel 32. The end of the shaft 35 carries a pointer 36 which registers with suitable graduations on a dial 37 to indicate the position of the said wedge members 27—27. The bar 34 is biased against the cam plate 33 by means of a spring 38.

The present invention further provides means for increasing the usability of the machine in forming dough for loaves of different shapes. The said means preferably include an adapter 39 for the pressure board, the construction of which includes a suitable plate 40 which is preferably of a heavy canvas material providing a required degree of flexibility. The said plate is bent upwardly, as at 41, and has secured to its underside a relatively thin canvas covering 42 the sides of which are folded inwardly over elongated pads of a suitable felt material to provide downwardly extending side portions 44—44 upon the bottom of the said adapter. The said portions 44—44 cooperate with the upwardly turned side portions of the belt 12 upon the wedge members 27—27 so as to form the dough to produce a loaf having ends which are pointed to a greater degree than those of a loaf which is formed by the main pressure board 17 without the use of the said adapter.

The adapter includes an end bar 45 which extends over the front edge portion of the canvas covering 42 and is formed to provide a hook 46 that is adapted to be hooked over the front edge portion of the main pressure board 17 so as to secure the front end of the adapter thereto. The rear edge portion of the adapter has an upright cross bar 47 which is secured to feet 48—48 that are inserted under the flaps of the covering 42, between the plate 40 and the pads 43—43. The end portion of said covering extends over the side of the said bar 47 and a clamp bar 49 is fastened over the said extending portion of the covering. The adapter is secured, by means of a screw 50 which extends through the bar 49, covering 42 and bar 47, to an upright bracket 51 which is mounted upon the top of the carrier 17.

It will be clearly understood by those skilled in the art that sheeted dough which is delivered upon the belt 12 will be carried under the pressure board and rolled between the top of the belt and the bottom of the surface adapter in the well known manner. As the dough is rolled it is also formed to produce the finished loaf of the desired shape.

When the carrier 17 is used as a pressure board without the adapter and the wedge members 27—27 are spread apart, the dough will be molded to produce bread loaves having relatively blunt ends. When the adapter is used and the wedge members 27—27 are drawn towards each other in the position shown in Fig. 3, the dough will be molded to produce loaves having relatively pointed ends such as those of commonly known French or Vienna style loaves.

I claim:

1. A molding machine including a frame, an endless belt movable upon said frame, a pressure board supported above and spaced from said belt, means for adjusting the said pressure board relatively to the belt for molding dough into different forms, a hood covering said pressure board, means carried by said pressure board extending through the hood for indicating the adjustment of the pressure board relatively to the belt, means for adjusting the side portions of said belt to conform with adjustments of the pressure board, and means located exteriorly on the machine for indicating the adjustments of the belt.

2. A dough molding machine including a base, a belt movable upon said base, a pressure board adjustably positioned above and spaced from said belt, means including laterally movable members located below the pressure board for inclining the side portions of the belt upwardly to vary the form of the dough molded in said machine, means for adjusting the said laterally movable members to vary the positions of the side portions of the belt, and indicating means for indicating the positions of said side members, the said indicating means including a cam plate movable with at least one of said side members, a rocker bar operated by said cam member and extending to the exterior of the machine, a dial plate mounted upon said exterior, and a pointer carried by the said rocker bar and cooperating with the said dial plate to indicate the adjustments of the said laterally movable members.

3. A dough molding machine including a base, an endless belt movable upon said base, a pressure board including a carrier adjustably supported upon and spaced from said belt and a detachable adapter mounted against the bottom of said carrier, a hook member projecting from the front end of the said adapter and adapted to hook over the front end of the carrier, and connecting means accessible at the opposite ends of the adapter and carrier for securing the said adapter to the carrier.

4. In a dough molding machine, the combination of a frame, means mounted upon said frame providing a supporting surface, an endless belt lying upon and movable over said surface, a pressure board supported above and spaced from said surface, means for adjusting the pressure board relatively to the belt, means including members disposed at opposite side portions of the belt and lying upon the said surface beneath the belt for flexing the opposite side portions of said belt as it moves over the said surface, and means for adjusting said members upon said surface transversely to the direction of movement of the belt thereon.

5. In a dough molding machine, the combination of a frame, a table mounted upon said frame and having a supporting surface with a slot therein, an endless belt movable upon said surface, belt flexing members between said surface and belt for flexing opposite side portions of the belt upwardly from said surface as the belt moves thereover, means mounted under the table and connected to the flexing members through said slot for adjusting said members transversely to the direction of movement of the belt over said surface, and a pressure board adjustably mounted over the said belt.

6. In a dough molding machine, the combination set forth in claim 5 wherein the belt flexing members are slidably mounted directly upon the supporting surface.

7. In a dough molding machine, the combination of a frame, a table upon said frame having a supporting surface, a flexible endless belt movable over and upon said surface, a pair of wedge-shaped members slidable upon said surface transversely to the movement of the belt thereon and adapted to flex the side portions of the belt upwardly from said surface and to dispose said side portions angularly thereto, the said table having a transverse opening therethrough, a bar mounted under said opening and having opposed threads connected to said wedge-shaped members by means extending through said opening for moving them in opposite directions transversely to the direction of movement of the belt and retaining them in different positions on said surface, a carrier disposed above said table and adjustable relatively to the belt, and an adapter carried by the carrier and disposed oppositely to said belt.

8. The subject matter set forth in claim 7 wherein the adapter is provided with a bottom surface having downwardly inclined side portions cooperating with the side portions of the belt for producing bread loaves having pointed ends.

9. In a dough molding machine, the combination of a frame including side members, a table upon said side members and having a supporting surface, an endless belt resting upon and movable over said surface, opposed members slidable upon said surface transversely to the movement of the belt thereon for flexing the side portions of the belt upwardly as it moves over the table, the said table having an opening therethrough, and means mounted under the table and extending through said opening for adjusting said members relatively to each other and transversely to the direction of movement of the belt.

References Cited in the file of this patent

UNITED STATES PATENTS

| 889,465   | Keller et al.   | June 2, 1908  |
| 892,559   | Smith et al.    | July 7, 1908  |
| 1,037,820 | Carroll         | Sept. 3, 1912 |
| 1,641,781 | Parsons         | Sept. 6, 1927 |
| 1,787,778 | Dell            | Jan. 6, 1931  |
| 1,796,922 | Eseman          | Mar. 17, 1931 |
| 1,805,018 | Scruggs         | May 12, 1931  |
| 1,870,256 | Lauterbur et al.| Aug. 9, 1932  |
| 2,246,477 | Attaway et al.  | June 17, 1941 |
| 2,261,043 | Winfree         | Oct. 28, 1941 |
| 2,636,455 | Martin          | Apr. 28, 1953 |

FOREIGN PATENTS

| 7,743 | Great Britain | Dec. 28, 1915 |